United States Patent
Jacobsen et al.

(10) Patent No.: US 9,458,821 B2
(45) Date of Patent: Oct. 4, 2016

(54) ATTACHMENT SYSTEM FOR A WIND TURBINE ROTOR BLADE ACCESSORY

(75) Inventors: Eric Morgan Jacobsen, Greenville, SC (US); Bruce Clark Busbey, Greer, SC (US); Qi Zhu, Simpsonville, SC (US); Scott Gabell Riddell, Greer, SC (US); Juergen Esser, Bevergem (DE); Jan Willem Bakhuis, Nijverdal (NL); Pradeepa Nagabhushana, Bangalore (IN)

(73) Assignee: General Electric Company, Schenectady, NY (US)

( * ) Notice: Subject to any disclaimer, the term of this patent is extended or adjusted under 35 U.S.C. 154(b) by 627 days.

(21) Appl. No.: 13/609,719

(22) Filed: Sep. 11, 2012

(65) Prior Publication Data

US 2014/0072440 A1    Mar. 13, 2014

(51) Int. Cl.
*F03D 1/06*    (2006.01)

(52) U.S. Cl.
CPC ............... *F03D 1/06* (2013.01); *F03D 1/0675* (2013.01); *F05B 2240/30* (2013.01); *F05B 2260/30* (2013.01); *F05B 2260/96* (2013.01); *Y02E 10/721* (2013.01)

(58) Field of Classification Search
None
See application file for complete search history.

(56) References Cited

U.S. PATENT DOCUMENTS

| | | |
|---|---|---|
| RE19,412 E | 1/1935 | Zaparka |
| 2,450,440 A | 10/1948 | Mills |
| 3,528,753 A | 9/1970 | Dutton et al. |
| 3,586,460 A | 6/1971 | Toner |
| 4,329,119 A | 5/1982 | Baskin |
| 4,626,172 A | 12/1986 | Mouille et al. |
| 5,088,665 A | 2/1992 | Vijgen et al. |
| 5,346,367 A | 9/1994 | Doolin et al. |
| 7,059,833 B2 | 6/2006 | Stiesdal et al. |
| 7,458,777 B2 | 12/2008 | Herr |
| 7,637,721 B2 | 12/2009 | Driver et al. |
| 8,083,488 B2 * | 12/2011 | Fritz .............................. 416/224 |
| 8,162,590 B2 | 4/2012 | Haag |
| 8,414,261 B2 * | 4/2013 | Bonnet ................ F03D 1/0641 415/119 |
| 8,506,250 B2 * | 8/2013 | Bagepalli .............. F03D 1/0675 29/889.71 |
| 8,834,127 B2 * | 9/2014 | Giguere et al. ............... 416/228 |
| 2007/0065290 A1 | 3/2007 | Herr |
| 2007/0077150 A1 | 4/2007 | Llorente Gonzalez |
| 2009/0074585 A1 | 3/2009 | Koegler et al. |
| 2009/0087314 A1 * | 4/2009 | Haag ............................. 416/147 |
| 2010/0047070 A1 * | 2/2010 | Slot et al. ................. 416/146 R |
| 2010/0296940 A1 | 11/2010 | Zuteck |
| 2010/0296941 A1 | 11/2010 | Zuteck |

(Continued)

FOREIGN PATENT DOCUMENTS

DE    102012000431 A1 *    7/2013

OTHER PUBLICATIONS

"Evaluation of 3M Solar Acrylic Foam Tapes for Durability", 3M, Aug. 2011.*

(Continued)

*Primary Examiner* — Craig Kim
*Assistant Examiner* — Christopher R Legendre
(74) *Attorney, Agent, or Firm* — Dority & Manning, P.A.

(57) ABSTRACT

A rotor blade assembly for a wind turbine has a rotor blade. A strip-member blade accessory is mounted to one of the rotor blade surfaces that stretches under normal operating conditions of the wind turbine. The blade accessory has a base portion. An attachment layer connects the base portion to the rotor blade surface and has a lower shear modulus than the base portion to allow for shear slippage between the base portion and the underlying rotor blade surface.

19 Claims, 5 Drawing Sheets

(56) References Cited

U.S. PATENT DOCUMENTS

| | | |
|---|---|---|
| 2011/0142635 A1 | 6/2011 | Frizt |
| 2011/0142666 A1* | 6/2011 | Drobietz et al. ............. 416/228 |
| 2011/0142668 A1 | 6/2011 | Rao |
| 2011/0211969 A1* | 9/2011 | Nies .............................. 416/230 |
| 2011/0268558 A1 | 11/2011 | Driver |
| 2012/0027590 A1 | 2/2012 | Bonnet |
| 2012/0257977 A1* | 10/2012 | Jensen et al. ............. 416/223 R |
| 2012/0257979 A1* | 10/2012 | Jensen et al. ............. 416/223 R |
| 2013/0223988 A1* | 8/2013 | Kristensen .................... 415/119 |
| 2014/0072440 A1* | 3/2014 | Jacobsen et al. ......... 416/241 R |
| 2014/0328692 A1* | 11/2014 | Riddell ................ F03D 1/0675 416/236 R |

\* cited by examiner

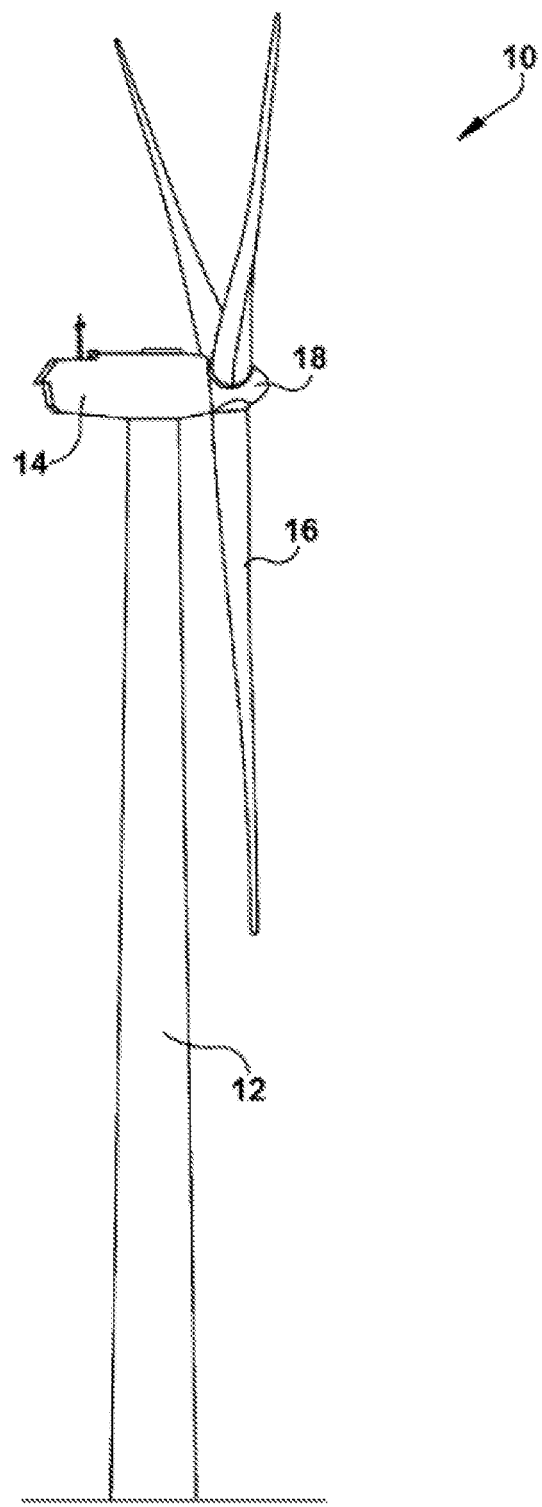
FIG. -1-

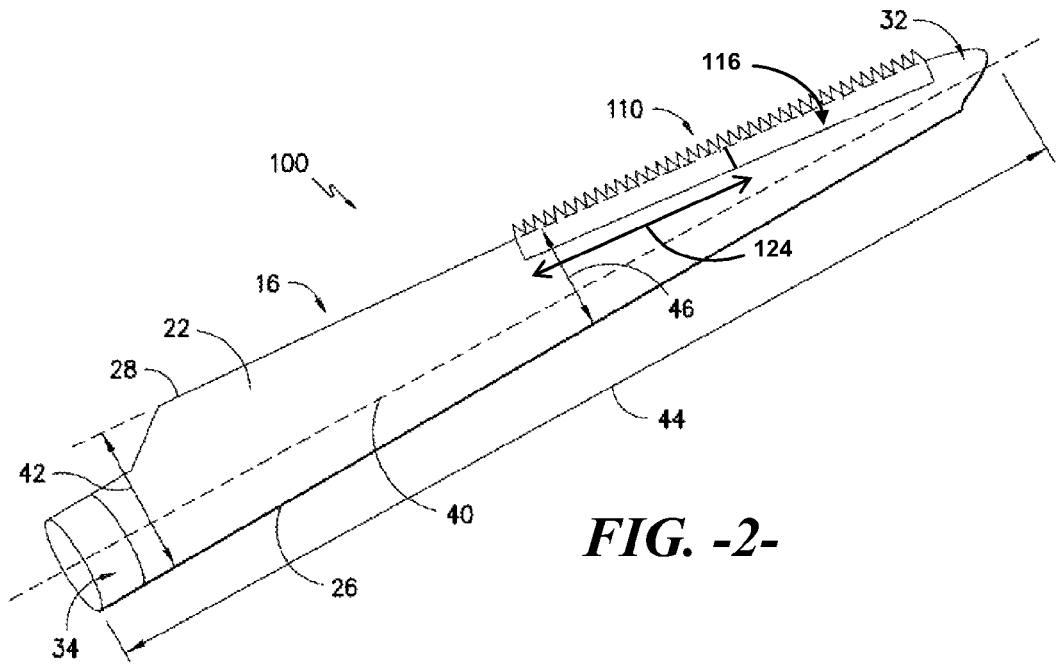
FIG. -2-
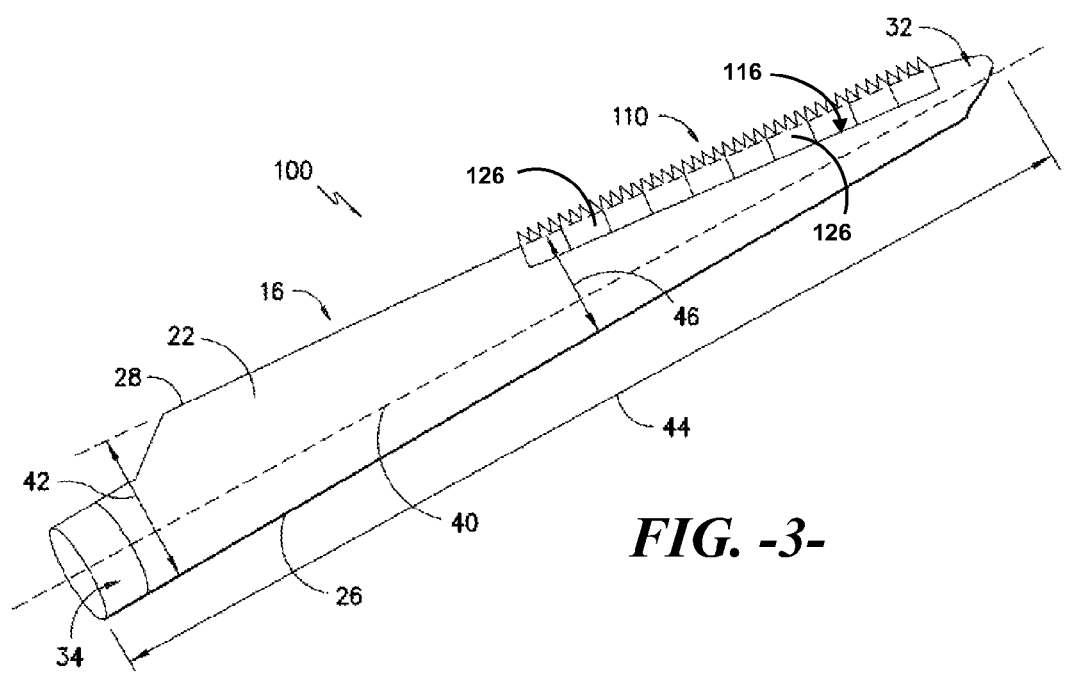
FIG. -3-

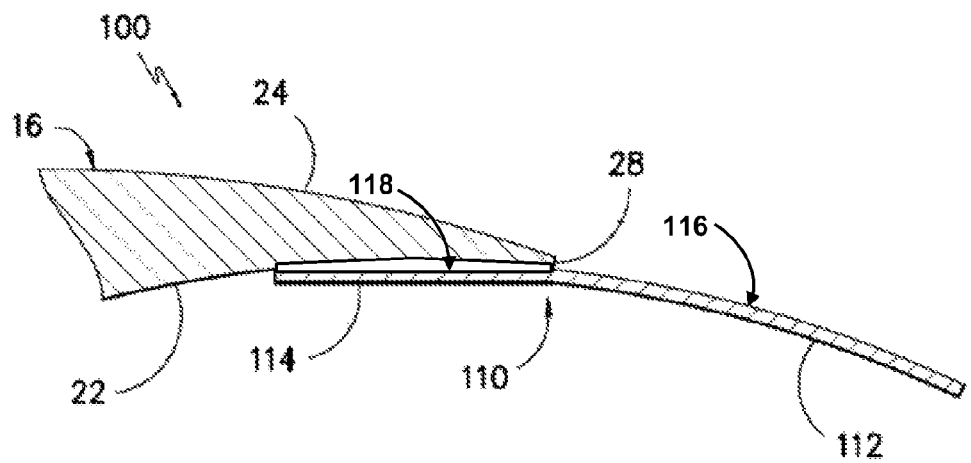
FIG. -4-
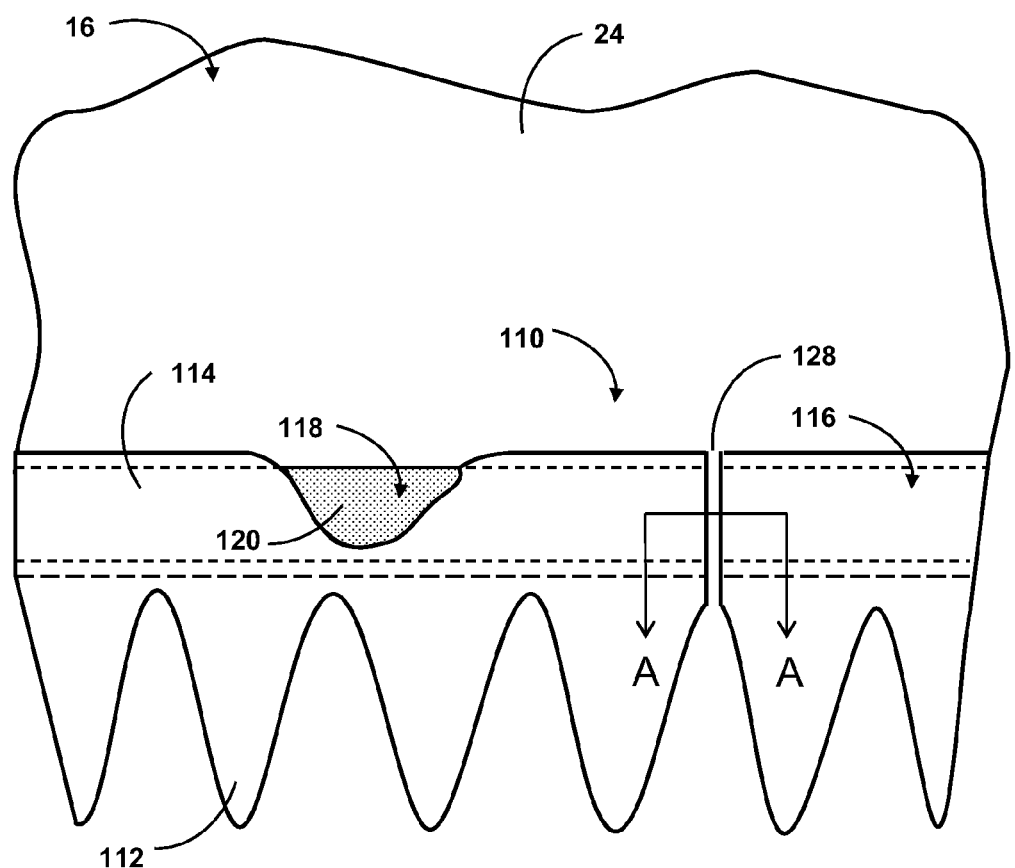
FIG. -5-

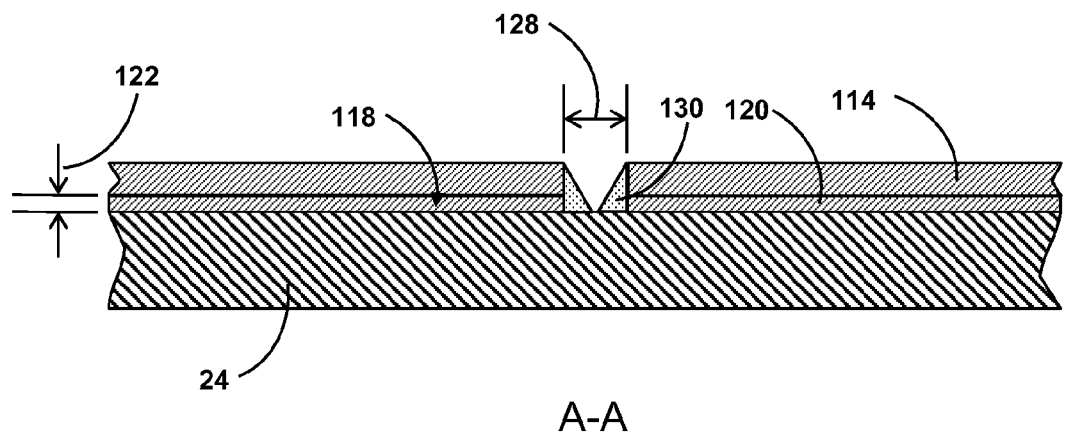
A-A
*FIG. -6-*
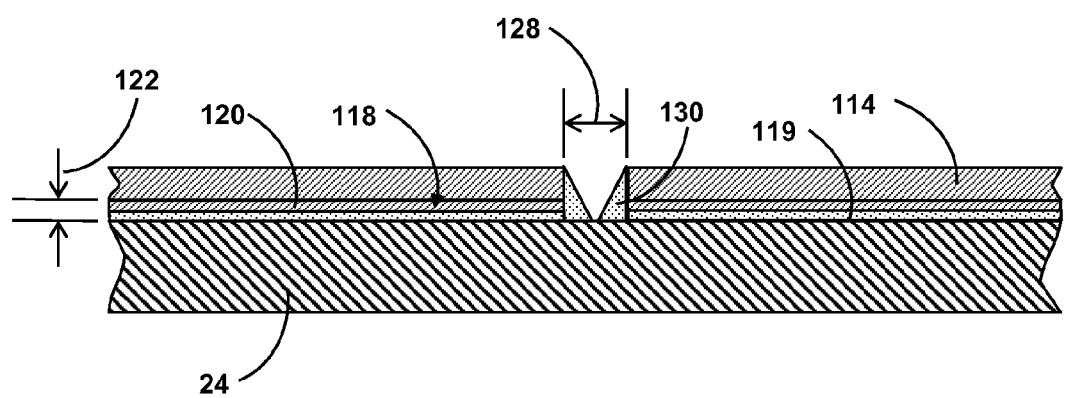
*FIG. -7-*

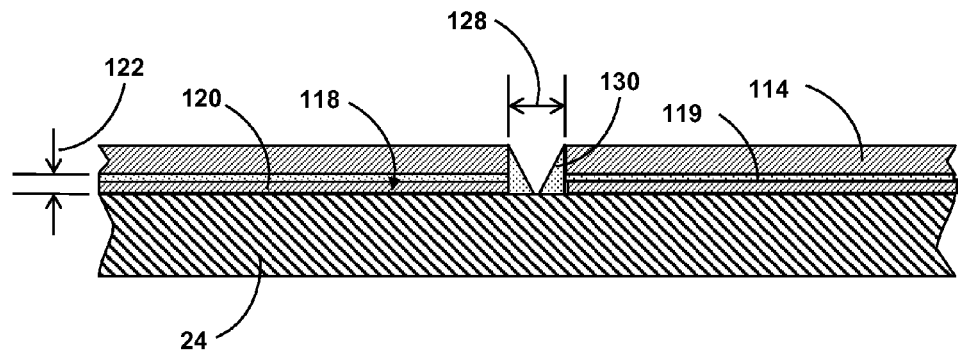
FIG. -8-
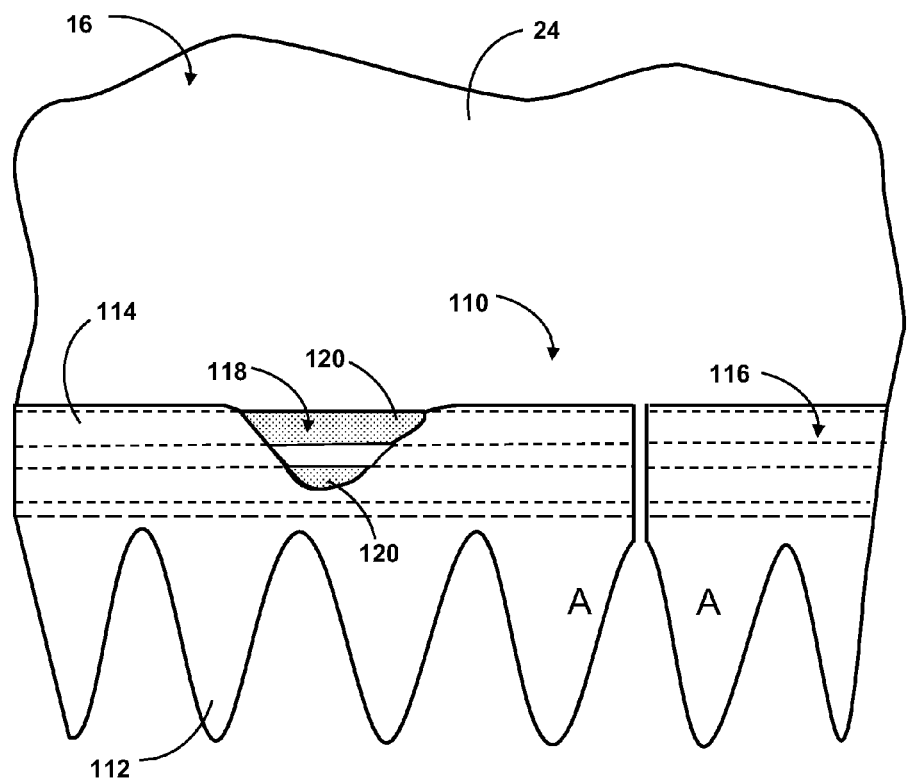
FIG. -9-

ATTACHMENT SYSTEM FOR A WIND TURBINE ROTOR BLADE ACCESSORY

FIELD OF THE INVENTION

The present disclosure relates in general to wind turbine rotor blades, and more particularly to a system for attaching an accessory component to a wind turbine rotor blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, various accessory components are attached to the rotor blades of wind turbines to perform various functions during operation of the wind turbine. Frequently, these components are attached adjacent to the trailing edges of the rotor blades. For example, noise reducers or flow enhancers may be attached to the trailing edges of the rotor blades to reduce the noise and increase the aerodynamic efficiency of the rotor blade.

Typical prior art noise reducers are often provided as serrated strips mounted directly to a trailing edge surface of the rotor blade using glue or another suitable adhesive. This configuration may have a variety of disadvantages. For example, the noise reducers are generally mounted to rotor blades during manufacturing before the rotor blades are transported to the wind turbine site. The noise reducers are thus easily susceptible to damage during transportation. Attachment of the serrated strips to the stiffer blade material using a relatively high modulus adhesive or glue results in high shear stresses being imparted to the strips during normal operational bending or twisting of the rotor blades, which makes the strips prone to cracking and delamination. Additionally, the adhesives used to mount the blade accessories make replacement of the accessories difficult, expensive, and time consuming.

Thus, an improved attachment system for wind turbine rotor blade accessories, such as serrated noise reducer strips, would be desired. For example, an attachment system that allows for on-site mounting to a rotor blade would be advantageous. Further, a system that reduces damage to the accessories from high shear stresses would be advantageous, as well as a system that allows for relatively easy, cost-effective, and efficient replacement.

BRIEF DESCRIPTION OF THE INVENTION

Aspects and advantages of the invention will be set forth in part in the following description, or may be obvious from the description, or may be learned through practice of the invention.

In one embodiment, a rotor blade assembly for a wind turbine includes a rotor blade having surfaces that define a pressure side, a suction side, a leading edge, and a trailing edge extending between a blade tip and a root. A strip-member blade accessory is mounted to one of the rotor blade surfaces that flexes or stretches (referred to generically as "stretches" herein) under normal operating conditions of the wind turbine. The blade accessory includes a base portion that may be in the form of a plate-like member. An attachment layer is provided to connect the base portion to the rotor blade surface, wherein the attachment layer has a lower shear modulus than the base portion to allow for shear slippage between the base portion and the underlying rotor blade surface. The shear modulus is, in certain embodiments, within the range of 50 kPa-1 MPa. With this unique configuration, the blade accessory is essentially isolated from shear stresses resulting from stretching of the underlying substrate. The intermediate attachment layer allows for relative shear movement or slippage between the components such that stresses that might otherwise cause cracking or delamination of the blade accessory are not significantly imparted to the blade accessory.

In a particular embodiment, the attachment layer may be a foam-based strip material (e.g., a tape or sheet material) with adhesive on both interface sides thereof, such as a Very High Bond (VHB) or SAFT (Solar Acrylic Foam Tape) foam-based tape. The attachment layer may have a particular thickness that provides the shear slippage characteristic without adding a detrimental height aspect that could adversely affect the aerodynamic performance of the blade. For example, the attachment layer may have a thickness between 0.5 mm-5.0 mm.

In an advantageous embodiment, the strip member blade accessory is segmented into smaller, adjacently aligned components. For example, the strip-member blade accessory may be defined by like segments having a length of between 0.3 meters to less than 2.0 meters. In a certain embodiment, the segments have a length of less than 1.0 meters.

The strip-member blade accessory may, in one embodiment, be attached along the trailing edge, leading edge, or any other location on the rotor blade. The blade accessory may include a plurality of like segments attached along the trailing edge of the rotor blade with a gap between edges of adjacent segments. Certain embodiments may include fillet seals in the gap between the edges of adjacent segments.

It should be appreciated that the blade accessory is not limited by design or function. For example, in one embodiment, the accessory may be a noise reducer accessory having a plurality of serrations extending from the base plate. In another embodiment, the accessory may include a base plate with a plurality of aerodynamic features extending therefrom.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of one embodiment of a wind turbine of the present disclosure;

FIG. 2 is a perspective view of one embodiment of a rotor blade assembly of the present disclosure;

FIG. 3 is a perspective view of another embodiment of a rotor blade assembly of the present disclosure;

FIG. 4 is a cross-sectional view of another embodiment of a rotor blade assembly of the present disclosure;

FIG. 5 is an enlarged partial cut-away view of an embodiment of a rotor blade assembly of the present disclosure;

FIG. 6 is a cross-sectional view taken along the lines indicated in FIG. 5;

FIG. 7 is a cross-sectional view of an alternative embodiment of a rotor blade assembly;

FIG. 8 is a cross-sectional view of still another alternative embodiment of a rotor blade assembly; and FIG. 9 is an enlarged partial cut-away view of an alternative embodiment of a rotor blade assembly of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a rotor blade 16 according to the present disclosure may include surfaces defining a pressure side 22 and a suction side 24 extending between a leading edge 26 and a trailing edge 28. The rotor blade 16 may extend from a blade tip 32 to a blade root 34. The surfaces defining the pressure side 22, suction side 24, leading edge 26, and trailing edge 28 further define a rotor blade interior.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flap-wise direction and/or in a generally edgewise direction. The flap-wise direction may generally be construed as the direction (or the opposite direction) in which the aerodynamic lift acts on the rotor blade 16. The edgewise direction is generally perpendicular to the flap-wise direction. Flap-wise curvature of the rotor blade 16 is also known as pre-bend, while edgewise curvature is also known as sweep. Thus, a curved rotor blade 16 may be pre-bent and/or swept. Curving may enable the rotor blade 16 to better withstand flap-wise and edgewise loads during operation of the wind turbine 10, and may further provide clearance for the rotor blade 16 from the tower 12 during operation of the wind turbine 10.

The rotor blade 16 may further define a pitch axis 40 (FIGS. 2 and 3) relative to the rotor hub 18 of the wind turbine 10. For example, the pitch axis 40 may extend generally perpendicularly to the rotor hub 18 and blade root 34 through the center of the blade root 34. A pitch angle or blade pitch of the rotor blade 16, i.e., an angle that determines a perspective of the rotor blade 16 with respect to the air flow past the wind turbine 10, may be defined by rotation of the rotor blade 16 about the pitch axis 40.

The rotor blade 16 may further define chord 42 and a span 44. As shown in FIGS. 2 and 3, the chord 42 may vary throughout the span 44 of the rotor blade 16. Thus, as discussed below, a local chord 46 may be defined for the rotor blade 16 at any point on the rotor blade 16 along the span 44.

Referring to FIGS. 2 and 3, the present disclosure relates to a rotor blade assembly 100 that includes a strip-member blade accessory 110 configured on the rotor blade 16. The blade accessory 110 is an elongated member that is attached to one of the blade surfaces for any intended functionality. For example, known structures are attached to wind turbine rotor blades 16 to enhance the aerodynamic efficiency/performance of the blades. Other known structures are attached to reduce the noise generated by the blade 16. It should be appreciated that the present invention is not limited to any particular type or configuration of blade accessory 110.

In the illustrated embodiments, the strip-member blade accessory 110 is a noise reducer 116 attached to the pressure side 22 or suction side 24 of the blade 16 along a portion of the trailing edge 28. Alternatively, the noise reducer 110 may be configured on a surface of the rotor blade 16 adjacent the leading edge 26 of the rotor blade 16, or adjacent the tip 32 or the root 34 of the rotor blade 16, or at any other suitable position on the rotor blade 16. Such devices are generally used to reduce the aerodynamic noise being emitted from the rotor blade 16 during operation of the wind turbine 10 and/or may increase the aerodynamic efficiency/performance of the rotor blade 16.

The blade accessory 110 may be formed from various materials. A conventional construction is a relatively stiff fiberglass laminate material that is "stiffer" than the underlying shell material of the pressure 22 or suction 24 sides. As explained above, with conventional attachment means, stretching or flexing of the blade surfaces during normal operating conditions of the wind turbine 10 may impart significant shear stresses to the blade accessory 110, resulting in any combination of cracking, de-bonding, or delamination of the blade accessory.

The blade accessory 110 includes a base portion 114 attached to the blade surface. This base portion may be defined as a generally continuous plate-like structure that presents a generally flat, planar surface that contours and adheres to the mating blade surface. Functional components may be formed integral with the base portion 114, or separately attached t the base portion. In the noise reducer 116 embodiment illustrated in the figures, a plurality of serrations 112 extend from the base portion 114. While in exemplary embodiments the serrations 112 are generally V-shaped, in alternative embodiments the serrations 112 may be U-shaped, or may have any other shape or configuration suitable for reducing the noise being emitted from and/or increasing the aerodynamic efficiency/performance of the rotor blade 16 during operation of the wind turbine 10. For example, in some non-limiting embodiments, the serrations 112 may be generally sinusoidal or squared-sinusoidal.

Referring to FIGS. 4 through 6, an attachment layer 118 is provided to connect the base portion 114 of the blade accessory 110 to the rotor blade surface. This attachment layer 118 has a lower shear modulus than the base portion 114 to allow for shear slippage between the relatively stiff base portion 114 and the underlying rotor blade surface. It should be appreciated that the properties of the attachment layer will vary depending on numerous factors, such as blade material, blade accessory material, blade size, blade loads, and so forth. For commercial grade wind turbines, the shear modulus is, in certain embodiments, within the range of 50 Kpa-1 MPa. With this unique configuration, the blade accessory 110 is essentially isolated from shear stresses resulting from stretching of the underlying blade substrate. The intermediate attachment layer 118 allows for relative shear movement or slippage between the components such that stresses that might otherwise cause cracking or delamination of the blade accessory 110 are not significantly imparted to the blade accessory 110.

In a particular embodiment, the attachment layer 118 may be a double-sided adhesive sheet or strip material 120, such as a Very High Bond (VHB)/SAFT (Solar Acrylic Foam Tape) foam-based tape. Various examples of VHB/SAFT foam-based materials are commercially available, for example from 3M Corporation of St. Paul, Minn., USA, The foam attachment layer 120 will shear a small but defined amount with flexing of the underlying blade surfaces, thus reducing shear stresses in the blade accessory 110.

The attachment layer 118 may be selected to have a particular thickness 122 (FIG. 6) that provides the desired shear slippage or strain isolation characteristic without adding a detrimental height aspect that could adversely affect the aerodynamic performance of the blade. For example, the adhesive tape may have a thickness between 0.5 mm-5.0 mm.

The attachment layer 118 may be applied as a continuous strip between the base portion 114 and underlying blade surface, as depicted in FIG. 5, or may be applied in a discontinuous pattern. For example, in the embodiment depicted in FIG. 9, the attachment layer 118 includes a plurality of distinct strips 120 (e.g., tape or sheet strips) with a chord-wise gap between adjacent strips. In other embodiments, the attachment layer may include span-wise gaps between distinct strips 120.

It has also been determined by the present inventors that the length of the strip-member blade accessory 110 in combination with the attachment layer 118 is a factor that can be varied to reduce shear stresses in the blade accessory 110. For example, fatigue testing has shown that, for the same type of attachment layer 118, at a certain length the blade accessory 110 will de-bond from the blade surface. In an advantageous embodiment, the strip member blade accessory 110 has a length 124 (FIG. 2) of between 0.1 meters to less than 2.0 meters. In a certain embodiment, the blade accessory 110 has a length of less than 1.0 meters.

Referring to FIGS. 3 through 6, an embodiment of a blade assembly 100 is illustrated wherein the blade accessory 110 is defined by a plurality of strip components 126 longitudinally aligned and attached along an edge of the blade 16 with a gap 128 (FIG. 6) between adjacent components 126. The shorter components 126 have the reduced shear stress advantages and combine to provide an effective noise reducer 112 along a substantial portion of the trailing edge 28. Each of the components 126 may have a length of between 0.1 meters to less than 2.0 meters. In the illustrated embodiment depicted in FIGS. 5 and 6, the attachment layer 118 (e.g., tape 120) is discontinuous along the length of the components 126 and does not bridge the respective gaps 128. The gaps 128 allow for relative shear slippage between the different components 126 with less slippage and shear strain on the individual tape sections. In a particular embodiment, the gap 128 may be, for example, 5 mm. Referring to FIG. 6, fillet seals 130 may be provided at the edges of the respective segments 126 to protect the attachment layer 118 from moisture or other elements. The seals 130 may be, for example, any type of flexible caulking material.

FIG. 7 depicts an embodiment wherein the attachment layer 118 includes a layer of resin or putty 119 between the strip/sheet material layer 120 (such as a foam-based layer as described above) and the underlying blade composite material. The overall thickness 122 of the attachment layer 118 is preferably within the limits discussed above in this embodiment.

Similarly, FIG. 8 depicts an embodiment wherein the attachment layer 118 includes a layer of resin or putty 119 between the strip/sheet material layer 120 (such as a foam-based layer as described above) and the overlying blade accessory base portion 114.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
   a rotor blade having surfaces defining a pressure side, a suction side, a leading edge, and a trailing edge extending between a tip and a root;
   a strip-member blade accessory mounted to one of the rotor blade surfaces that stretches under normal operating conditions of the wind turbine, the strip-member blade accessory comprising:
      a plurality of individual strip components attached along an edge of the rotor blade, each of the strip components extending in the span-wise direction from a first end to a second end, the plurality of individual strip components being spaced apart by a defined uniform gap between edges of adjacent strip components that provides relative shear slippage between the adjacent strip components, each strip component comprising:
         a base portion;
         a discontinuous attachment layer connecting the base portion of each strip component to the rotor blade surface, the attachment layer extending from the first end to the second end of each of the strip components, each attachment layer having a lower shear modulus than the base portion to allow for shear slippage between the base portion and the underlayer rotor blade surface; and a plurality of fillet seals limited to the gaps between the edges of adjacent strip components.

2. The rotor blade assembly as in claim 1, wherein each attachment layer comprises a foam-based strip member with adhesive on opposite interface sides thereof.

3. The rotor blade assembly as in claim 2, wherein each attachment layer comprises a Very High Bond (VHB) or SAFT (Solar Acrylic Foam Tape) foam-based strip material.

4. The rotor blade assembly as in claim 2, wherein each attachment layer has a thickness between 0.5 mm 5.0 mm.

5. The rotor blade assembly as in claim 1, wherein the strip components have a length between 0.1 meters to less than 2.0 meters.

6. The rotor blade assembly as in claim 5, wherein the strip-member blade accessory has a length of less than 1.0 meters.

7. The rotor blade assembly as in claim 5, wherein the strip components have a length between 0.3 meters to less than 2.0 meters.

8. The rotor blade assembly as in claim 1, wherein the strip-member blade accessory is attached along the trailing edge of the rotor blade.

9. The rotor blade assembly as in claim 1, wherein the gap between the edges of adjacent strip components is 5 mm.

10. The rotor blade assembly as in claim 1, wherein the blade accessory is a noise reducer accessory having a plurality of serrations extending from the base portion.

11. The rotor blade assembly as in claim 1, further comprising a putty or resin layer disposed between each attachment layer and at least one of the rotor blade surface or the respective blade accessory base portion.

12. A rotor blade assembly for a wind turbine, comprising:
a rotor blade having surfaces defining a pressure side, a suction side, a leading edge, and a trailing edge extending between a tip and a root;
a strip-member segment attached along the trailing edge surface of the rotor blade, the strip-member segment comprising a plurality of longitudinally aligned strip components, each of the ship components comprising:
a base portion extending in a span-wise direction from a first end to a second end and having a plurality of serrations extending from the base portion, and
a discontinuous attachment layer connecting the base portion of each strip component to the trailing edge rotor blade surface, the attachment layer extending from the first end to the second end of each of the strip components, the attachment layer having a lower shear modulus than the base portion to allow for shear slippage between the base portion and the underlying trailing edge rotor blade surface;
the strip components attached along an edge of the rotor blade, the strip components being spaced apart by a defined uniform gap between edges of adjacent strip components that provides relative shear slippage between the adjacent strip components; and
a plurality of fillet seals limited to the gaps between the edges of adjacent strip components.

13. The rotor blade assembly as in claim 12, wherein each of the plurality of strip components has a length of less than 1.0 meters.

14. The rotor blade assembly as in claim 4, wherein the defined gap between adjacent edges of adjacent strip components is 5 mm.

15. The rotor blade assembly as in claim 12, wherein each attachment layer comprises a foam-based strip member with adhesive on opposite interface sides thereof.

16. The rotor blade assembly as in claim 15, wherein each attachment layer comprises a Very High Bond (VHB) or SAFT (Solar Acrylic Foam Tape) foam-based strip material.

17. The rotor blade assembly as in claim 16, wherein each attachment layer has a thickness between 0.5 mm-5.0 mm.

18. The rotor blade assembly as in claim 12, further comprising a putty or resin layer disposed between each attachment layer and at least one of the rotor blade trailing edge surface or the respective strip member base portion.

19. The rotor blade assembly as in claim 12, wherein each of the plurality of strip components has a length of between 0.3 meters to less than 2.0 meters.

* * * * *